(12) United States Patent
Feese et al.

(10) Patent No.: US 8,485,813 B2
(45) Date of Patent: Jul. 16, 2013

(54) THREE STAGE LOW $NO_x$ BURNER SYSTEM WITH CONTROLLED STAGE AIR SEPARATION

(75) Inventors: James J. Feese, Elizabethtown, PA (US); Bruce A. Wartluft, Lebanon, PA (US)

(73) Assignee: Hauck Manufacturing Company, Lebanon, PA (US)

( * ) Notice: Subject to any disclaimer, the term of this patent is extended or adjusted under 35 U.S.C. 154(b) by 416 days.

(21) Appl. No.: 11/972,745

(22) Filed: Jan. 11, 2008

(65) Prior Publication Data
US 2009/0181333 A1    Jul. 16, 2009

(51) Int. Cl.
*F23M 3/00*    (2006.01)

(52) U.S. Cl.
USPC ...... 431/9; 431/12; 431/159; 431/8; 431/187; 431/10; 431/348

(58) Field of Classification Search
USPC ............. 431/9, 12, 159, 8, 187, 10, 115, 116, 431/348
See application file for complete search history.

(56) References Cited

U.S. PATENT DOCUMENTS

| | | | |
|---|---|---|---|
| 2,458,541 A * | 1/1949 | Urquhart | 431/10 |
| 2,458,542 A * | 1/1949 | Urquhart | 431/10 |
| 3,746,499 A * | 7/1973 | Guerre et al. | 431/182 |
| 3,809,525 A * | 5/1974 | Wang et al. | 431/353 |
| 4,004,875 A * | 1/1977 | Zink et al. | 431/9 |
| 4,203,717 A * | 5/1980 | Facco et al. | 431/182 |
| 4,341,512 A | 7/1982 | Wojcieson et al. | |
| 5,101,633 A * | 4/1992 | Keller et al. | 60/737 |
| 5,511,970 A | 4/1996 | Irwin et al. | |
| 5,813,846 A | 9/1998 | Newby et al. | |
| 5,979,342 A * | 11/1999 | Leisse et al. | 110/264 |
| 6,210,151 B1 | 4/2001 | Joshi et al. | |
| 6,461,145 B1 * | 10/2002 | Giraud et al. | 431/10 |
| 6,986,658 B2 * | 1/2006 | Stephens et al. | 431/115 |
| 7,163,392 B2 | 1/2007 | Feese et al. | |
| 7,175,423 B1 | 2/2007 | Pisano et al. | |
| 2006/0246388 A1 | 11/2006 | Feese et al. | |

* cited by examiner

*Primary Examiner* — Avinash Savani
(74) *Attorney, Agent, or Firm* — Woodcock Washburn LLP

(57) ABSTRACT

A low $NO_x$ burner system is disclosed that reduces the emission of CO and HC during cold furnace startups, minimizes $NO_x$ formation with preheated air, and provides a flat stable flame due to burner design improvements including three stage combustion. The burner system is designed to operate in either a low or high temperature mode by controlling the amount of combustion air provided to stage 1 and stage 2 combustion. The burner system is designed to heat the interior of a furnace for high-temperature combustion/furnace processes, such as aluminum melting and steel processes. The burner system can also be used for low temperature processes at temperatures below the auto-ignition temperature of the fuel and still produce very low CO, HC and $NO_x$ emissions.

17 Claims, 6 Drawing Sheets

THREE STAGE LOW NO$_x$ BURNER SYSTEM WITH CONTROLLED STAGE AIR SEPARATION

FIELD OF THE INVENTION

The present invention is generally directed to an air staged low nitrogen oxide burner system that provides a flat stable flame from high fire to low fire operations and a method of controlling the burner to achieve low pollutant emissions.

BACKGROUND OF THE INVENTION

One of the by-products created by the combustion of hydrocarbon (HC) fuels in burners that use atmospheric air is nitrogen oxides (NO$_x$). NO$_x$ emissions have become a highly regulated pollutant in many industrial processes including steel and aluminum manufacture. Efforts to reduce fuel consumption through combustion air preheating have led to exponential increases in NO$_x$ levels from conventional burner designs, which has been well known in the industry for many years. Efforts to save fuel and increase combustion efficiency via recuperative and/or regenerative combustion systems combined with stricter governmental permitting laws for acceptable NO$_x$ emissions from furnaces has led to a much greater awareness and need to solve this problem in recent years.

Techniques for controlling and inhibiting NO$_x$ formation in furnace combustion processes may include provisions for staging fuel, staging combustion air, recirculating flue gas into the burner, recirculating flue gas into the burner flame, altering combustion patterns with different degrees of swirl, and injection of water or steam into the burner or flame. Factors that contribute to the formation of NO$_x$ in burner fired combustion chambers are the oxygen content of the flame or combustion chamber, the temperature of the combustion chamber, the air preheat temperature, and the burner firing rate.

It is known that NO$_x$ emissions increase with combustion chamber temperatures, the temperature of the combustion air, and with oxygen content in the combustion chamber. However, these factors are difficult to predict because burners for different industrial processes operate at various furnace chamber temperatures, have various oxygen concentrations in the work chambers, may or may not have preheated combustion air, and are required to operate at different heat inputs depending of changing heat load requirements.

Previous efforts to solve the problem include the Staged Air, Low NO$_x$ Burner with Internal Recuperative Flue Gas Recirculation, U.S. Pat. No. 5,413,477. This design utilizes a combination of air staging and flue gas recirculation (FGR) for NO$_x$ reduction. However, the added capital expense for piping and controlling the recirculated flue gases are substantial in this design.

Another burner design by Bloom Engineering Co., Inc., International Patent No. WO 01/35022 A1, includes an air staged burner for lower NO$_x$ emissions, but does not address the cold furnace startup issue. In addition, there is still a need to reduce burner NO$_x$ emissions beyond that achieved by this burner.

Finally, Tokyo Gas Co., Ltd., U.S. Pat. No. 5,571,006, describes an air staging method for lower NO$_x$ emissions from burners including regenerative beds in the burner body. However, this design requires a separate ambient air connection to the burner body for flame stabilization and complete fuel burnout during cold furnace startups at/or below the auto ignition temperature of the fuel requiring added maintenance, installation, and operation costs.

In addition to not reducing the NOx emissions to an acceptable reduced value, these prior art burner designs also fail to produce a flat stable flame from low fire to high fire values. Low fire values are typically about ⅛ of high fire values. The production of a flat stable flame is important to provide a uniform heat flux to the material being heated.

A previous effort to reduce NOx emissions is disclosed in the Three Stage Low NO$_x$ Burner and Method, U.S. Pat. No. 7,4163,392, incorporated herein in the entirety by reference. This design utilizes a combination of air staging to provide for the first stage of combustion taking place substantially within a burner cup section of a refractory baffle, and the second stage of combustion taking place adjacent to the baffle and downstream of the baffle, and the third stage of combustion taking place substantially within the furnace. However, there is a continuing need to further reduce NOx emissions and improve flame stability with flat flame characteristics.

What is needed is a gas burner that is capable of very low NOx emissions when fired on either ambient or preheated combustion air. The burner should also reduce carbon monoxide CO and hydrocarbon HC emissions during cold furnace startups and reduce emissions without the added expense of multiple air and/or fuel connections. Additionally, the burner should provide a flat stable flame capable of providing a uniform heat flux to the furnace at both low temperature and high temperature operating conditions over a wide turndown range.

SUMMARY OF THE INVENTION

A low NOx burner system including a burner and a port block is disclosed. The burner includes an air inlet section, a burner body, a fuel passageway and a nozzle section. The port block includes an annular cavity having a first annular section having a substantially constant cross-section and a second annular section having an expanding cross-section.

The burner system reduces the emission of CO and HC during cold furnace startups and provides a flat stable flame due to burner design improvements. The burner system is designed to heat the interior of a furnace for high-temperature combustion/furnace processes such as aluminum and steel processes. Additionally, the burner can also be used for low temperature processes, at temperatures below the auto-ignition temperature of the fuel and still produce very low CO, HC and NO$_x$ emissions.

The novel design of the present invention provides for a burner that controls the amount of combustion air forming stage 1, stage 2 and stage 3 combustion air. The control of the amount of combustion air forming the separate combustion air stages allows the burner to operate at two different operating modes. The burner is designed to selectively operate at either a first low temperature mode, at which temperature the burner is operating below the auto-ignition temperature of the fuel, or at a second high temperature mode, at which temperature the burner is operating above the auto-ignition temperature of the fuel. The system and method of controlling the amount of air forming the separate combustion air stages may be incorporated into the burner body itself or may be present in external air piping to the burner body. Alternatively, the burner may be operated in one of either a low or high temperature mode without the use of controlling the amount of combustion air directed to each of the separate air stages.

In low temperature mode, the burner provides a flat flame pattern that is stable and uniform at low temperatures, even when the furnace is positively pressurized. This allows the burner to bring the furnace up to higher temperatures while still providing excellent heat transfer characteristics and low NOx emission. In high temperature mode, the burner takes advantage of additional air staging to achieve lower $NO_x$ emissions when compared to prior art burners.

An exemplary embodiment of the burner system includes a burner body having a primary air chamber and a secondary air chamber, an air inlet section configured to provide a controllable predetermined amount of stage 1 and stage 2 combustion air to the primary air chamber and stage 3 air to the secondary air chamber, a nozzle section comprising a nozzle, a flame holder, and a swirl rack disposed at one end of the burner body, a fuel passageway extending through the burner body and nested within the fuel nozzle and a port block attached to the nozzle section.

The nozzle section includes stage 1 air passageways for receiving stage 1 air from the primary air chamber and stage 2 air passageways for receiving stage 2 air from the primary air chamber. The nozzle section also includes a swirl rack. The swirl rack imparts a rotational motion to the stage 3 air as the stage 3 air is provided to the port block.

The fuel passageway includes a fuel inlet, a passageway tube, and a nozzle, the passageway tube having bleed holes configured to bleed fuel from the passageway tube into venturi tubes that inject the bled fuel into the stage 1 air as it exits the stage 1 air passageways. The nozzle is configured to inject fuel into the rotating stage 3 air in the port block.

In one exemplary embodiment, the air inlet section includes a main inlet section for providing combustion air directly to the secondary air chamber and an air by-pass having a staged air valve for providing combustion air to the primary air chamber.

In another exemplary embodiment, the air inlet section includes a divider plate and a stage air valve configured to regulate a predetermined amount of combustion air into the primary air chamber.

In yet another exemplary embodiment, the burner body includes a primary air inlet between the primary air chamber and the secondary air chamber for providing a predetermined amount of combustion air to the primary air chamber from the secondary air chamber.

A second exemplary embodiment of the present invention provides for a method of operating an air staged flame burner system including the steps of providing combustion air to a combustion air inlet section, separating the combustion air in the air inlet section into stage 1 air and stage 2 and stage 3 air, providing the stage 1 air and stage 2 air to a primary air chamber within a burner body, and providing the stage 3 air to a secondary chamber in the burner body. The method further includes providing fuel to a fuel passageway. The fuel passageway including a fuel inlet, a tube passageway, and a nozzle. Stage 1 air from the primary air chamber is provided to stage 1 air passageways in the nozzle section, and from the nozzle section the stage 1 air is mixed with fuel from the bleed holes to form a first combustion mixture. The first combustion mixture is ignited to form a first combustion region. Stage 2 air from the primary air chamber is provided to stage 2 air passageways in the nozzle section. The stage 2 air flows exits the nozzle section where it is mixed with the first combustion mixture to form a second combustion mixture. The second combustion mixture is ignited to form a second combustion region, The method additionally includes providing stage 3 air from the secondary air chamber to a swirl rack in the nozzle section configured to impart a rotational motion to the stage 3 air as the stage 3 air is provided to a cavity of a port block. The method also includes injecting fuel from the fuel nozzle into the rotating stage 3 air in the cavity of the port block, mixing the injected fuel and rotating stage 3 air with the second combustion mixture to form a tertiary combustion mixture, and igniting the tertiary combustion mixture.

In one exemplary embodiment, the method further includes providing the stage 1 and stage 2 air from the air inlet section to the primary air chamber by a by-pass section having a staged air valve. The staged air valve is controlled to provide a predetermined amount of stage 1 and stage 2 air directed to the primary chamber in the burner body.

In an alternative exemplary embodiment, the method further includes providing the stage 1 and stage 2 air from the air inlet section to the primary air chamber by a divider plate and a stage air valve configured to regulate a predetermined amount of combustion air directed to the primary air chamber.

In another alternative exemplary embodiment, the burner body includes a primary air inlet between the primary air chamber and the secondary air chamber for providing a predetermined amount of combustion air to the primary air chamber from the secondary air chamber.

The method additionally includes wherein stage 1 air is mixed with fuel from the tube passageway by bleed holes configured to bleed fuel from the passageway tube into venturi tubes that inject the bled fuel into the stage 1 air as it exits the stage 1 air passageways.

The method also includes wherein the cavity of the port block comprises a first section having a substantially constant annular cross-section and a second section having an expanding annular cross-section, the second section configured to provide a flat stabilized flame in the low temperature mode of operation.

The method further includes controlling the staged air valve so that the by-pass provides between about 3% to about 10% of the combustion air as stage 1 air and stage 2 air to the primary chamber in the burner body to provide for a low temperature mode of operation.

The method additionally includes controlling the staged air valve so that the by-pass provides less than about 3% of the combustion air as stage 1 air and stage 2 air to the primary chamber in the burner body to provide for a high temperature mode of operation.

An advantage of the present invention is that it provides a gas burner capable of very low $NO_x$ emissions when fired with either ambient or preheated combustion air.

Another advantage of the present invention is that it reduces emissions of CO and HC during cold furnace startups while providing for a flat stable flame.

Another advantage of the present invention is that it reduces emissions of CO and HC during high temperature operations.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
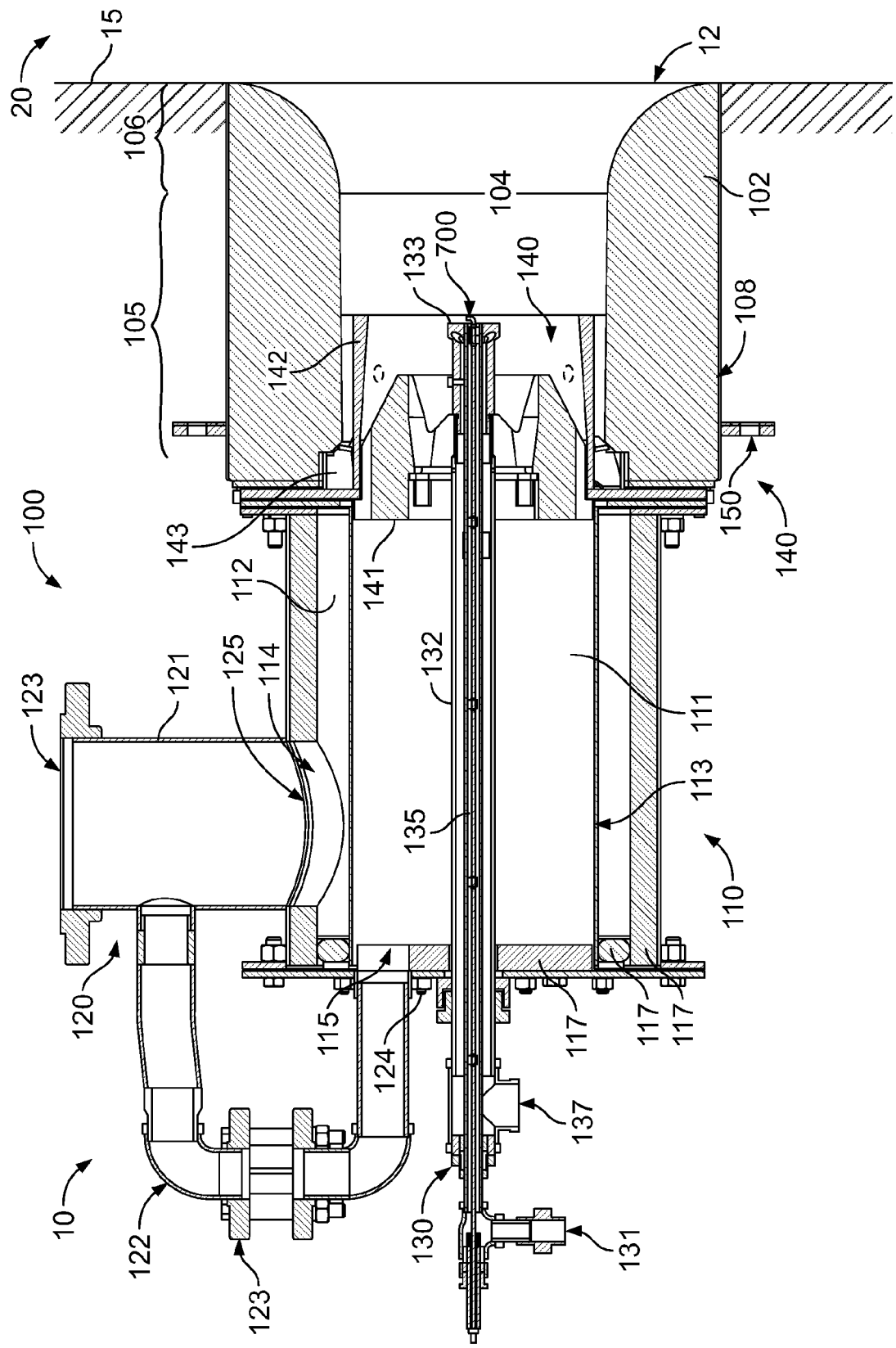
FIG. 1 is a cross-sectional view of an exemplary embodiment of a low $NO_x$ burner system of the present invention.

FIG. 1 shows an exemplary embodiment of the burner system 10 of the present invention. The burner system 10 includes a burner 100 and a port block 102. The burner 100 includes a burner body 110, an air inlet section 120, a fuel passageway 130, and a burner nozzle section 140. The burner 100 may be formed of a material selected from the group consisting of carbon steel, stainless steel, and combinations thereof, or other burner materials as known in the art.

The port block is disposed around the nozzle section 140 as shown in FIG. 1. The port block 102 includes an interior cavity 104. The interior cavity 104 has a first section 105 having a substantially constant circular cross-section and a second section 106 having an expanding circular cross-section. The second section 106 expands along the curved surface 107 as also shown in FIG. 1. The port block 102 may have a circular, square, or other outside cross-section. The port block 102 is formed of a high temperature ceramic or refractory material as is known in the art. The port block 102 may include a metal sleeve 108.

The burner system 10 is mounted to a furnace support (not shown) by furnace mounting flange 150. Other mounting methods may be used to support the burner system 10 as are known in the art. The burner system 10 is aligned with an opening 12 in a furnace wall 15 to provide flame to the interior of a furnace 20 as shown in FIG. 1.

The burner body 110 includes a primary air chamber 111 and a secondary air chamber 112. The primary air chamber 111 and the secondary air chamber 112 are separated by an air sleeve 113. The burner body 110 includes a first opening 114 and a second opening 115 for receiving combustion air from the air inlet section 120. The burner body 110 includes insulation 117 to reduce the outside temperature of the burner body 110 when pre-heated combustion air is used. Additional insulation may be used in the air inlet section 120 and around the fuel passageway 130. Alternatively, the insulation 117 may be omitted. The insulation 117 may be a ceramic fiberboard, a refractory material, or other similar insulative material as is known in the art. Alternatively, the insulation 117 may not be included in the burner 100 when preheated combustion air is not used.

The air inlet section 120 provides combustion air to the burner body 110 for distribution to the nozzle section 140. In this exemplary embodiment of the invention, the air inlet section 120 includes a main inlet section 121 and an air by-pass section 122. The main inlet section 121 has an inlet 123 for receiving combustion air. The combustion air is provided at a pressure of up to about 12 osig. The air by-pass section 122 includes a staged air valve 123.

Figure 1A:
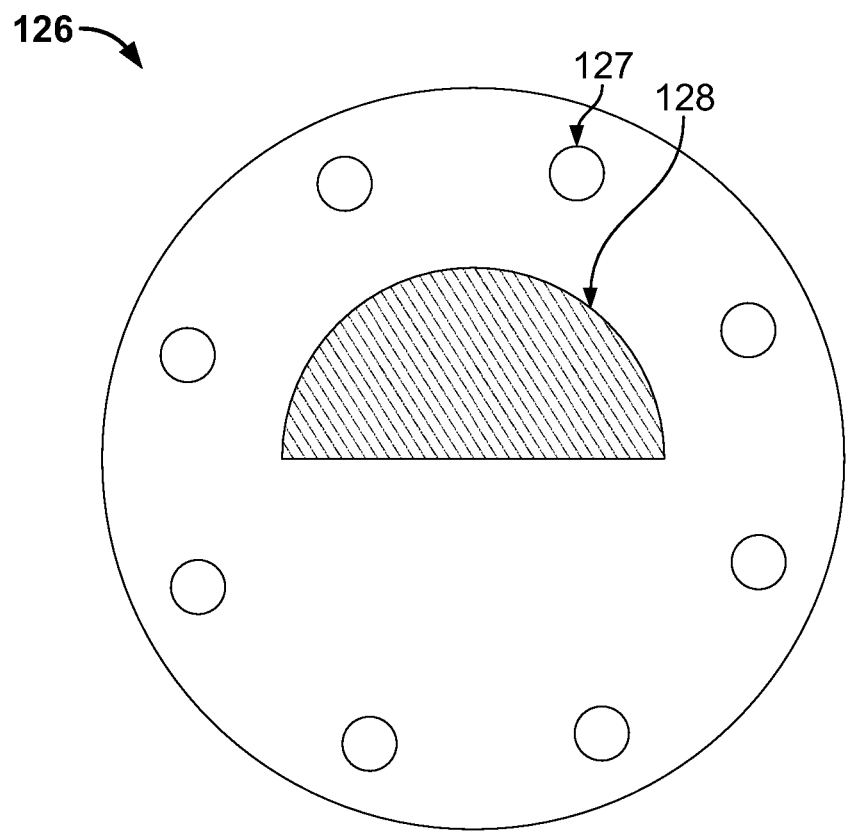
FIG. 1A is illustration of a top view of an optional orifice plate that may be used with the burner system of the present invention.

The air inlet section 120 may additionally include an orifice plate 125. A top view of the orifice plate 125 is shown in FIG. 1A. As can be seen in FIG. 1A, orifice plate 126 includes flange bolt holes 127 and air inlet opening 128. The flange bolt holes 127 attach the plate 125 between the inlet opening 128 and the burner body 110 through by fasteners such as bolts (not shown). The air inlet opening 128 is configured to direct substantially all of the stage 3 air entering the secondary air chamber 112 to one side of the secondary air chamber 112 to impart a swirling motion to the stage 3 air as it transverses secondary air chamber 112 towards the nozzle section 140.

The main inlet section 121 is welded to the burner body 110 and configured to supply combustion air to the first opening 114 as shown in FIG. 1. Alternatively, the main inlet section 121 may be connected to the burner body 110 by other methods including by flanges, or the main inlet section 121 may be integrally cast with the burner body 110. The by-pass section 122 is connected to the burner body 110 by flange 124 to supply combustion air to the second opening 115 as also shown in FIG. 1. The by-pass section 122 may be connected to the burner body 110 by any conventional method as is known in the art.

The exemplary embodiment shown in FIG. 1 controls the distribution of air within the burner 100 by a staged air valve 123 configured within the by-pass 122. The staged air valve 123 is configured to regulate the amount of combustion air passing through the air stage valve 123 and into the primary air chamber 111. A valve motor (not shown), which is connected to a source of electric power as known in the art, controls the valve 123 to select an amount of combustion air to pass through the valve 123. The valve motor (not shown) is controlled by a control system (not shown) to regulate the amount of combustion air flowing through the by-pass 122 as determined by the furnace operating temperature. In this exemplary example, the valve 123 is configured to be open when the furnace temperature is below the auto-ignition temperature of the fuel and closed when the furnace temperature is above the auto-ignition temperature.

As combustion air enters the air inlet section 121 through the inlet 123, the combustion air is separated into two portions by the air bypass 122. A first portion of the combustion air, known as the stage 1 and stage 2 air, is diverted by air by-pass 122 to flow into the primary air chamber 111, while a second portion of the combustion air, known as stage 3 air, flows into the secondary air chamber 112. The stage 1 and stage 2 air flow through the primary air chamber 111 and into the nozzle section 140. The stage 3 air flows through the secondary air chamber 112 and into the nozzle section 140. The stage 1, stage 2 and stage 3 air are mixed with fuel from the fuel passageway 130 after exiting the nozzle section 140 and ignited.

The fuel passageway 130 includes a fuel inlet 137, a passageway tube 132, and a fuel nozzle 133. The fuel passageway 130 extends through the burner body 110 and nozzle section 140 as shown in FIG. 1. The fuel for combustion, which could be any gaseous fuel known in the art, such as, for example, natural gas, is provided to the fuel inlet 131 from a fuel source (not shown). Fuel flows from the fuel inlet 137 through the passageway tube 132 to the fuel nozzle 133 within the nozzle section 140 where it is injected into the combustion air. The gas nozzle 133 is nested within the nozzle section 140 as shown in FIG. 1.

Figure 2:
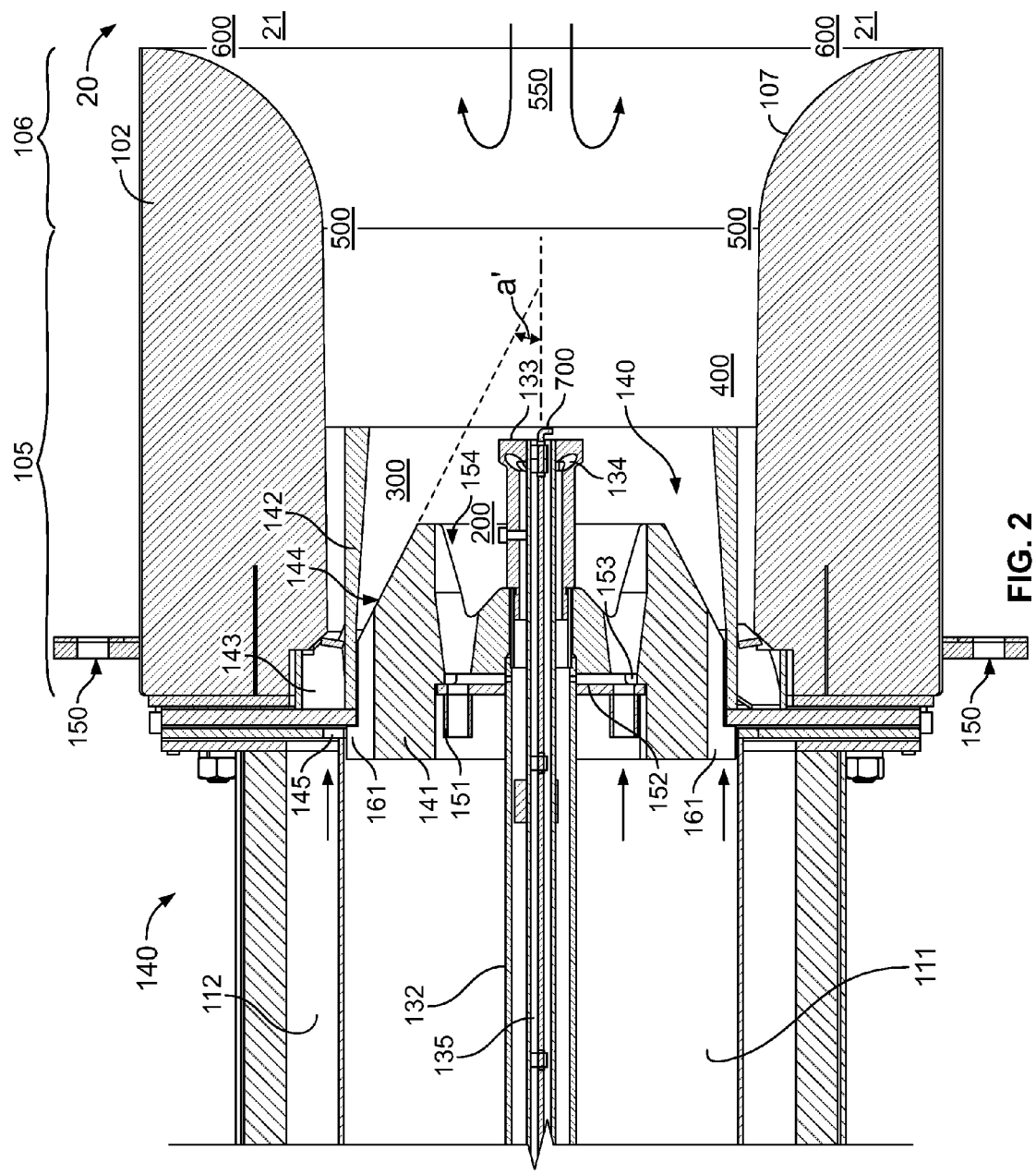
FIG. 2 is a partially enlarged cross-sectional view of the low $NO_x$ burner system of FIG. 1.

FIG. 2 shows an enlarged view of the nozzle section 140. The nozzle section 140 includes a nozzle 141, a flame holder 142, and a swirl rack 143. The nozzle 141 includes a tapered leading edge 144. The tapered leading edge 144 has an angle a' from the center axis of the nozzle of about 45° to about 70°, and more preferably has an angle of about 59°.

As shown in FIGS. 1 and 2, a spark igniter 700 is located on the fuel nozzle 133. The spark igniter 700 traverses the interior of the fuel passageway 130 and is connected to an electrical source (not shown) as is known in the art. The fuel passageway 130 contains an annular cooling air passageway 135 that surrounds the spark igniter 700.

As shown in FIG. 1, the cooling air passageway 135 has an opening 131 that is connected to a cooling air supply (not shown). Cooling air enters the cooling air opening 131, flows through the cooling air passageway 135, and exits the fuel nozzle 133 as shown in FIG. 1 to cool the spark igniter 700. Alternatively, the burner 100 may be provided with a gas pilot to ignite the fuel, as is well known in the art. Additionally, the burner 100 may be provided with different types of devices including an ultraviolet (UV) flame detector and an observation port, which are also well known in the art.

Combustion air from the primary air chamber 111 enters the nozzle section 140 at two locations. Stage 1 air from the primary air chamber 111 enters stage 1 air passages 151 in the nozzle 141. An opening in the fuel passageway 132, in this exemplary embodiment, fuel bleed ports 152 are used to bleed a small amount of fuel from the fuel passageway 132 into venturi tubes 153 where it is mixed with the stage 1 air as it exits the passages 151 as shown in FIG. 2. The mixture of stage 1 air and bleed fuel enters burner cup section 154. The size and number of bleed ports 152 may vary, but should be sufficient to allow for about 3% to about 15% by volume of the total fuel to be entrained in the stage 1 air when about 10% or less by volume of the total combustion air is flowing through the by-pass 122 (see FIG. 1). When ignited, the stage 1 air and the fuel in the burner cup section 154 forms a first stage combustion region 200. Alternatively, other openings, including but not limited to an annulus in the fuel passageway 132, may be used to bleed fuel from the fuel passageway 132

Figure 3:
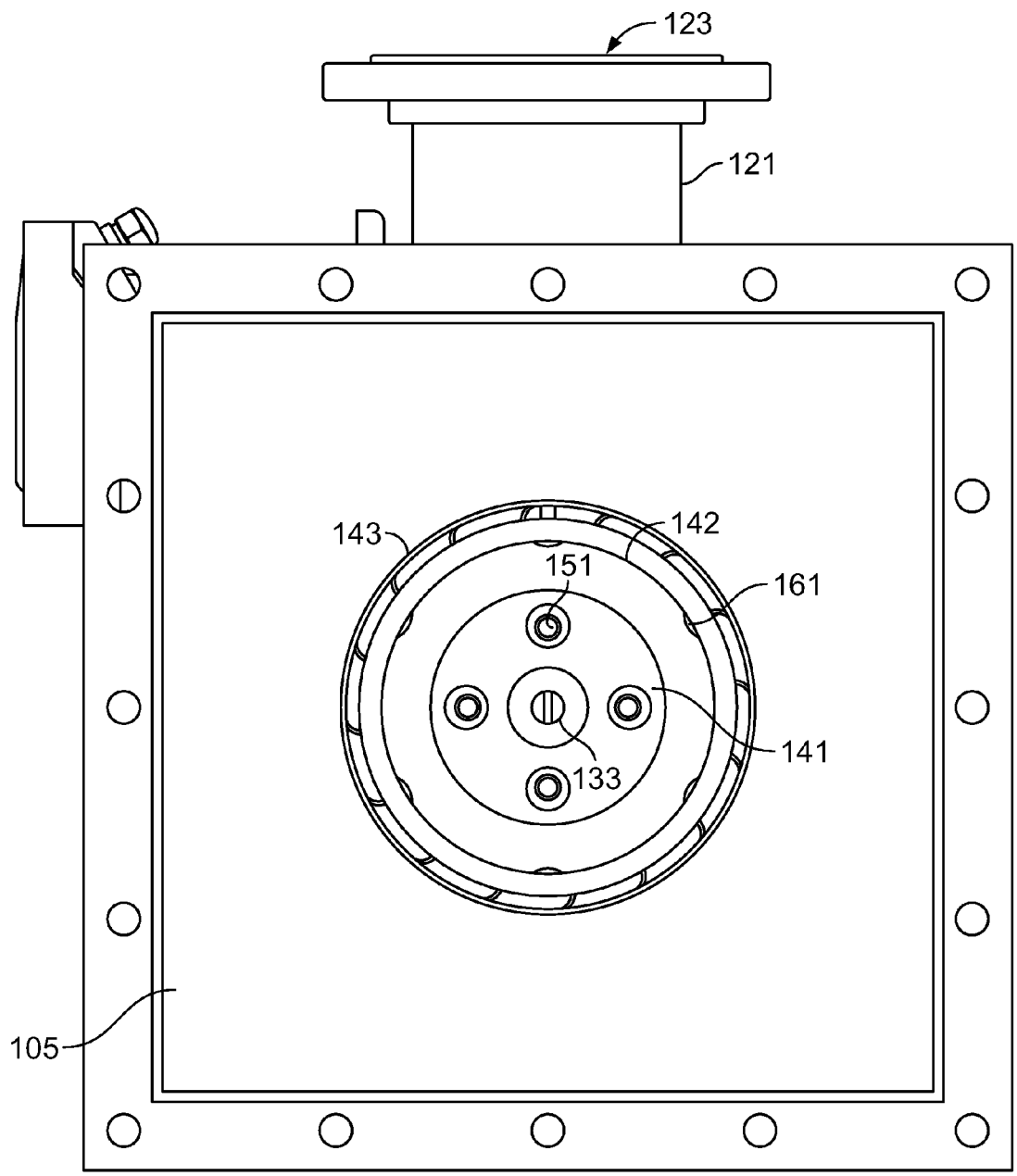
FIG. 3 is a front view of an exemplary embodiment of a low $NO_x$ burner system of the present invention.

The stage 1 air passages 151 are distributed in the nozzle 141 as shown in FIGS. 2 and 3. The size and number of the stage 1 air passages 151 may vary to deliver a predetermined amount of stage 1 air for combustion. As shown in FIG. 3, in this exemplary embodiment there are four stage 1 air passages having substantially circular cross-sections. In alternate embodiments, the cross-sections of the stage 1 air passages 151 may be any convenient geometric shape including, but not limited to, rectangular, square, and oval. Additionally, in alternative embodiments, the number of the stage 1 air passages may be any number of evenly spaced passages around the nozzle 140, and may even be an annular passage.

Stage 2 air flows from the primary air chamber 111 into stage 2 air passages 161 located between the nozzle 141 and the flame holder 142. The stage 2 air passages 161 may be of any functional geometric shape and the number of the stage 2 air passages 161 may vary. In this exemplary embodiment as shown in FIGS. 2 and 3, there are six stage 2 air passages 161 having a substantially semi-circular cross-section. In alternate embodiments, there may be as few as two or at least as many as ten stage 2 air passages 161. In alternate embodiments, the cross-sections of the stage 2 air passages 161 may be any convenient geometric shape including, but not limited to, rectangular, square, oval, which are evenly spaced passages around the nozzle 140. The stage 2 air passage may be an annular passage.

The stage 2 air exits the stage 2 passages 161 and enters a second stage combustion region 300. The flow of the stage 2 combustion air out of the stage 2 air passages 161 coupled with the tapered leading edge 144 of the nozzle 141 creates a negative pressure zone adjacent to the tapered leading edge 144. The products of first stage combustion, including partially combusted bleed fuel and some primary fuel from the fuel nozzle 133 are drawn back against the tapered leading edge 144 of the nozzle 141. The combustion of the fuel that is drawn back against the tapered leading edge 144 and the further combustion of any partially combusted products of first stage combustion takes place in a second stage combustion region 300. During low temperature operations when stage 1 and stage 2 combustion air are about 10% or less of the total combustion air, the partial combustion of fuel in the secondary combustion region 300 provides for additional flame stabilization which improves burnout of CO and HC's at low furnace temperatures. The partially burned fuel in the second stage combustion region 300 provides necessary flame anchoring on the flame holder area 400 with the majority of combustion taking place downstream of the flame holder area 400.

As shown in FIG. 2, stage 3 combustion air from the secondary air chamber 112 flows through passageway 145 and into the nozzle section 140. A swirl rack 143 imparts a swirling motion to the air as it passes between the flame holder 142 and the port block 102 before flowing out into the tertiary mixing zone 500.

In this exemplary embodiment, as shown in FIGS. 2 and 3, the swirl rack 143 surrounds the flame holder 142 and has a substantially circular cross-section. The swirl rack 143 may be omitted if the orifice plate 125 (FIG. 1) is used to impart a swirling motion to the stage 3 air, or both the swirl rack 143 and the orifice plate 125 (FIG. 1) may be used to impart a desired degree of swirling motion.

As shown in FIG. 2, the rotating stage 3 air mixes with the main combustion fuel exiting gas ports 134 of the gas nozzle 133 in the tertiary mixing zone 500. The rotating stage 3 air also mixes with the combustion products of the first stage combustion region 200 and the second stage combustion region 300 to form a tertiary combustion mixture. The tertiary combustion mixture continues to rotate within mixing zone 500 through the annular first section 105 and then into the annular second section 106 within the port block 102.

The tertiary combustion mixture flows from the primary mixing zone 500 into the furnace interior 20 and remains substantially flat against the furnace wall due to the coanda shape of the port block 106. Furnace flue gas is drawn into mixing region 550 from the furnace by negative pressure induced by the combined swirling motion of the tertiary combustion mixture and the coanda effect and entrained in the tertiary combustion mixture in mixing zone 500. When operating in low temperature mode, the primary and secondary combustion mixtures form a stabilized flame in the low temperature stabilized flame regions 200 and 300, respectively.

In high temperature mode, the tertiary combustion mixture flows from the primary mixing zone 500 to be projected into the furnace interior 20 forming a flat flame that is mostly invisible to the naked eye. Flue gas is still drawn into the mixing region 550 and more completely combusted. When operating in high temperature mode, no visible primary or secondary combustion flame is visible in the regions 200 and 300, respectively.

Figure 4:
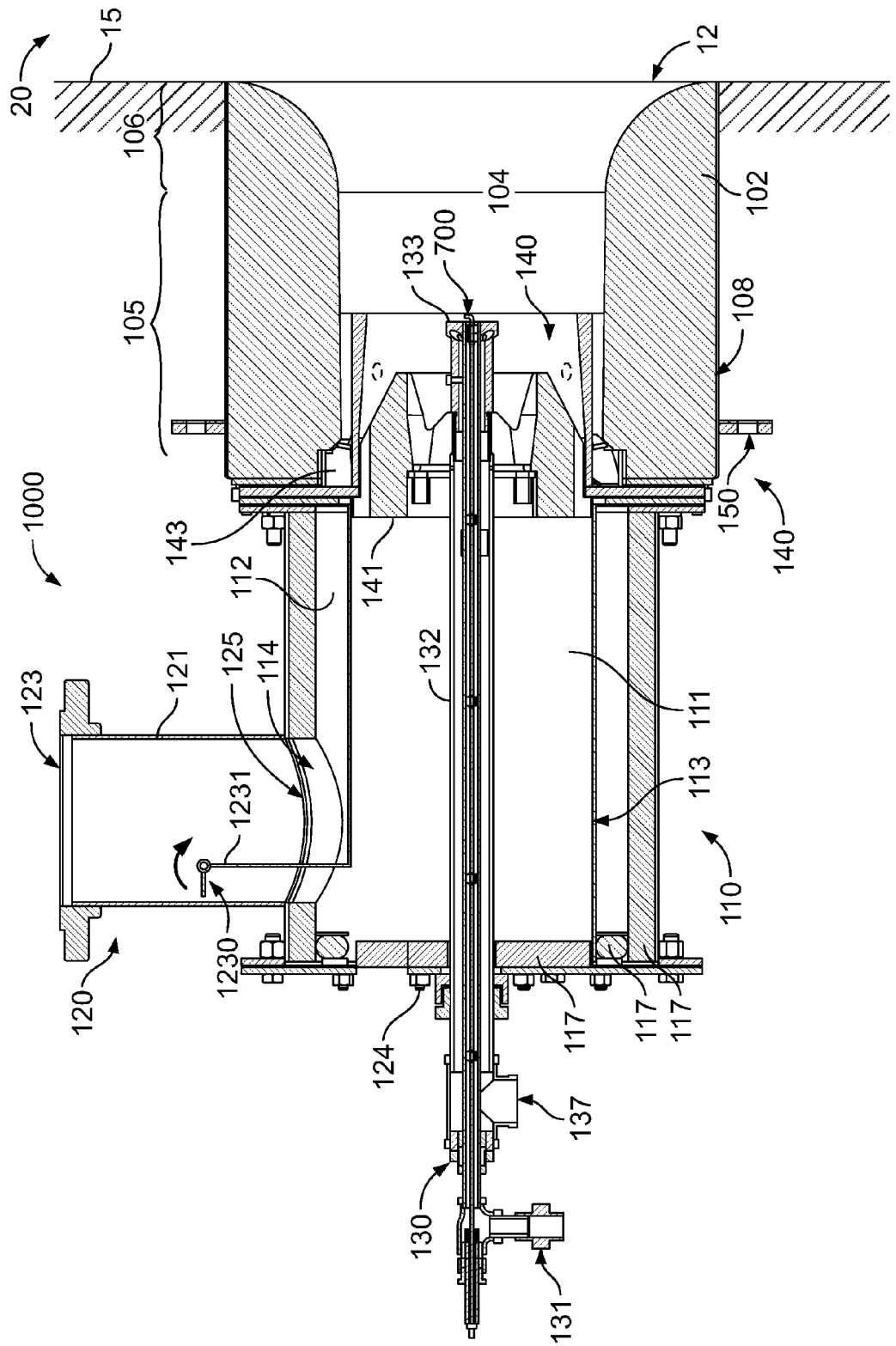
FIG. 4 is a cross-sectional view of an alternative exemplary embodiment of a low NO$_x$ burner system of the present invention.

An alternative embodiment of a burner system 1000 is shown in FIG. 4. Components similar to the burner system 100 of FIG. 1 are likewise numbered. Burner system 1000 includes a main air inlet 120 having an internal air stage valve 1230 and a divider plate 1231. The internal air stage valve 1230 controls the amount of stage 1 and stage 2 air flowing into the primary air chamber 111. As combustion air enters the air inlet section 121 through the inlet 123, the combustion air is separated into two portions by the stage valve 1230. A first portion of the combustion air, the stage 1 and stage 2 air, passes through internal air stage valve 1230 and into the primary air chamber 111, while a second portion of the combustion air, stage 3 air, flows directly into the secondary air chamber 112.

A valve motor (not shown), which is connected to a source of electric power as known in the art, controls the internal air stage valve 1230 to select a predetermined amount of stage 1 and stage 2 combustion air to pass through the internal air stage valve 1230 and into the primary air chamber 111. The valve motor (not shown) is controlled by a control system (not shown) and regulates the amount of combustion air flowing into the primary air chamber 111 as determined by the furnace operating temperature. The internal air stage valve 1230 is controlled to be in a more open position to allow more stage 1 and 2 air to enter the primary chamber 111 when the furnace temperature is below the auto-ignition temperature of the fuel, and in a more closed position, reducing the amount of stage 1 and 2 air entering the primary air chamber 111 when the furnace temperature is above the auto-ignition temperature.

Figure 5:
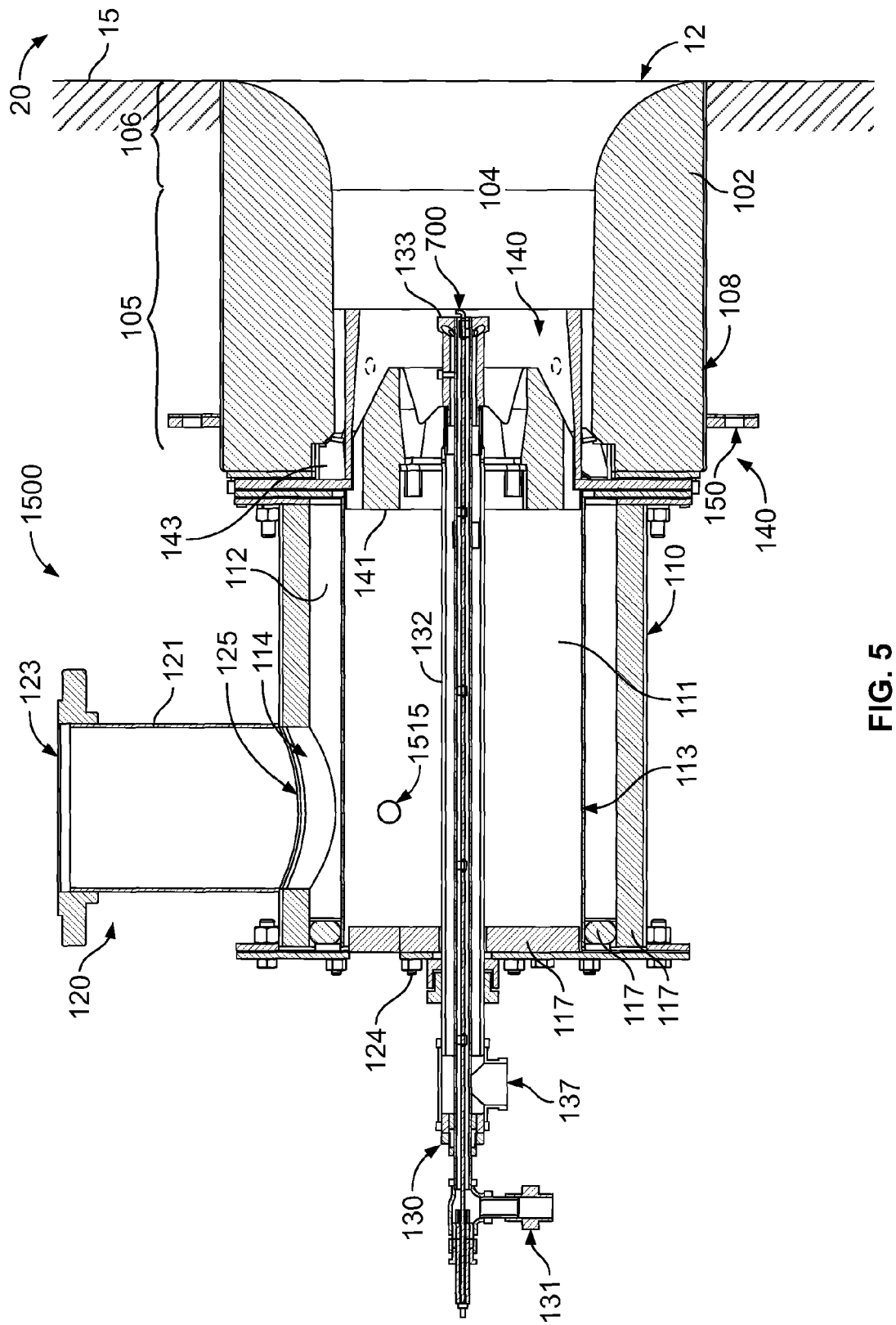
FIG. 5 is a cross-sectional view of another alternative exemplary embodiment of a low NO$_x$ burner system of the present invention.

A second alternative embodiment of a burner system 1500 is shown in FIG. 5. Components similar to the burner system 100 of FIG. 1 are likewise numbered. Burner system 1500 includes a main air inlet 120 that provides combustion air to the secondary air chamber 112. An air inlet 1515 in the air sleeve 113 allows combustion air to pass from the secondary air chamber 112 to the primary air chamber 111. The air inlet 1515 is sized to provide a predetermined amount of air to the primary air chamber 111. For example, the air inlet 1515 may be sized to supplying a predetermined amount of air to the primary air chamber 111 to operate the burner 1500 in either a low or high temperature mode.

A method of operating the burner system 10 according to an exemplary embodiment of the invention will now be discussed referring to FIGS. 1 and 2. The burner system 100 and its other embodiments of the present invention have two modes of operation, a low temperature mode and a high temperature mode. The low temperature mode is used during a cold furnace startup when the temperature of the furnace 20 is below the auto-ignition temperature of the fuel. The high temperature mode is used when the temperature of the furnace 20 is at or above the auto-ignition temperature of the fuel.

Each of the two modes requires a different percentage of stage 1 and stage 2 combustion air to be directed to the primary air chamber 111 for first and second stage combustion relative to the percentage of stage 3 combustion air directed to the secondary air chamber 112 for tertiary combustion. The modes are controlled through the use of the staged air valve 123 within the air by-pass section 122 as shown in FIG. 1. The staged air valve 123 is controlled through a control system as known in the art.

When the furnace temperature is below the auto-ignition temperature of the fuel, the staged air valve 123 is controlled to direct about 3% to about 10% of the total volume of combustion air to the primary air chamber 111 where it forms the stage 1 and stage 2 combustion air. As a result, about 90% to about 97% of the combustion air is directed to the secondary air chamber 112 to form the stage 3 air. This operating mode is known as the 90/10 operating mode.

In the 90/10 operating mode, a combustion flame is present at the first state combustion region 200, the second stage combustion region 300 and the flame holder combustion region 400. The stabilized flame present in the flame holder combustion region travels out along the wall 107 providing the desired flat flame profile.

The addition of the stage 3 air, which is about 90% to about 97% of the total air, assures nearly complete burnout of the remaining fuel for minimal CO and HC emissions. Meanwhile NOx emissions are still quite low as the $NO_x$ reducing benefits of partial air staging are in effect.

When the furnace temperature is above the auto-ignition temperature of the fuel, the staged air valve 123 is controlled to direct less than about 3%, and more preferably less than about 2%, of the total volume of combustion air to the primary air chamber 111 where it forms the stage 1 and stage 2 combustion air. As a result, about 97% or more, and more preferably about 98% or more of the combustion air is directed to the secondary air chamber 112 to form the stage 3 air. This operating mode is known as the 97/3 operating mode.

When the burner system 10 is operating in the 97/3 operating mode, there is no visible flame within the interior cavity 104 of the port block 102 as the combustion is substantially delayed and occurs in the furnace interior 21 at reduced flame temperatures, which results in further $NO_x$ reduction.

One of the advantages of the present invention over prior art burners is the reduction of harmful CO and HC emissions during startup, improved flame stability, and very low $NO_x$ emissions in both the 90/10 and 97/3 modes of operation. The three stage mixing and combustion of the fuel assist in providing the low emission benefits of the present invention. The venturi tubes 153 promote fuel and air mixing, burning, and flame stabilization for first stage combustion. The first stage combustion is important for flame stability in the 90/10 mode of operation. The second stage combustion in the second state combustion zone 300 is important to insure sufficient residence time and recirculation for the fuel and stage 2 air during the 90/10 mode of operation. The second stage combustion enhances flame stability in the 90/10 mode of operation. The third stage combustion serves to complete the mixing and burning of partially combusted fuel and products of combustion, such as CO, from first stage combustion and second stage combustion along with any remaining uncombusted fuel, air, and furnace gases in the 90/10 mode of operation. In addition, the rotating tertiary combustion air mixture moving into the interior 21 (FIG. 2) of furnace 20 (FIG. 2) induces furnace flue gases to mix and burn with the remaining fuel in the furnace 20 at lower flame temperatures. The lower flame temperatures of the tertiary combustion mixture combusting in the interior 21 of the furnace 20 produces lower $NO_x$ emissions. In addition, the present invention produces a visible and stable flame in the 90/10 mode of operation, which promotes low furnace temperature flame safety.

The burner system 10 of the present invention can be produced in a various number of capacities, as measured by an energy output of Million Btu/hr (MMBtu/hr). The smallest burner has a standard capacity of about 0.5 MMBtu/hr, while the largest burner has a capacity at or above about 8 MMBtu/hr, including among others 1 MMBtu/hr, 2 MMBtu/hr, 3 MMBtu/hr, and a 4 MMBtu/hr burner. Such energy outputs presume main combustion air pressure of about 4 osig to about 12 osig. An increase in the main air pressure would increase the energy output of the burner as more fuel could be supplied to the burner and combusted if it operated with a higher main combustion air pressure.

As additional excess air above and beyond the requirements for stiochiometric combustion increases the production of $NO_x$, excess main combustion air should be as low as possible to inhibit production of $NO_x$. While the burner system 10 of the present invention will work well with about 10 percent to about 15 percent excess main combustion air, the burner system 10 of the present invention should preferably be provided with less than 10 percent excess air and more preferably with about 5 percent excess air.

In addition, the burner system 10 of the present invention is capable of high turndown, which means that its ratio of energy production at full fuel capacity is high relative to the lowest energy production. Generally, the burner system 10 of the present invention is capable of being turned down to at least 8 to 1 while maintaining low excess air near stoichiometric operation. As an example, a specific burner system embodiment having a capacity of 5 MMBtu/hr can be turned down to at least 0.625 MMBtu/hr without difficulty while maintaining low excess air with very low emissions of $NO_x$, CO and HC. Such emissions generally depend on the firing rate (or thermal input), excess air conditions (with lower excess air being better), furnace temperature, air preheat temperature, and the mode in which the burner is operating. The 90/10 mode of operation results in higher $NO_x$ emissions than the 97/3 mode of operation.

The burner system 10 may be sized to provide for greater or lesser heating requirements, with the air passages 151 and the associated venturi tubes 153 optimized for mixing a predetermined amount of bleed fuel with stage 1 combustion air. The smaller the burner, the higher the percentage of bleed fuel to total fuel, with the bleed fuel comprising in the range of about 1 percent to about 20 percent of the total fuel in the present invention.

Additionally, the ratio of stage 1 air and stage 2 air are also dependent on the burner size, with the ratio being larger for larger burner sizes and smaller for smaller burner sizes. Generally this ratio will range from about 1:5 for the smaller burners (parts primary main combustion air: parts secondary main combustion air) to about 1:14 for the larger burners. However, the ratio can be smaller than 1:5 for burners smaller than 5 MMBth/hr and larger than 1:14 for burners that are larger than 20 MMBtu/hr.

In addition, the length of the annular cavity 104 of the port block 105 from the nozzle 141 to the furnace interior 21 varies, depending on the burner size, but is optimized to produce a residence time of partially burned products of combustion within the burner system 10 so that CO and HC are at least partially burned prior to mixing/burning with the stage 3 air and exiting into the furnace 20. Longer or shorter annular cavity lengths may be selected, however, choosing non-optimal lengths result in increased $NO_x$ emissions. In addition, there is an optimal configuration of the leading edge 144 for each size burner system design that minimizes emissions. For example, the optimal configuration of the leading edge 144 for a 5 MMBtu/hr burner system has an angle from the center axis of the nozzle of about 59°.

In an investigation leading up to this invention, a number of tests were run on a burner system having a capacity of about 5 Million Btu/hr. A test was run using the 5 Million Btu/hr run in the 90/10 operating mode with a combustion air temperature of about 60° F. (15° C.). About 5 percent excess air, above what was required for stoichiometric combustion, was provided through the main combustion air inlet. At a furnace temperature of about 1500° F. (815° C.), the emissions of $NO_x$ were measured at about 20 parts per million (ppm) corrected to 3 percent $O_2$ dry. The emissions of CO were approximately zero ppm.

A second test was run using the 5 Million Btu/hr run in the 97/3 operating mode with a combustion air temperature of about 60° F. (15° C.). About 5 percent excess air was provided through the main combustion air inlet. At a furnace temperature of about 2000° F. (1090° C.), the emissions of $NO_x$ were measured at about 13 parts per million (ppm) at 3 percent $O_2$ dry. The emissions of CO were measured at about 0 ppm at 3 percent $O_2$ dry.

A third test was run using the 5 Million Btu/hr run in the 90/10 operating mode with a combustion air temperature of about 800° F. (430° C.). About 5 percent excess air was provided through the main combustion air inlet. At a furnace temperature of about 1500° F. (815° C.), the emissions of $NO_x$ were measured at about 60 parts per million (ppm) at 3 percent $O_2$ dry. The emissions of CO were measured at about 3 ppm at 3 percent $O_2$ dry.

A fourth test was run using the 5 Million Btu/hr run in the 97/3 operating mode with a combustion air temperature of about 800° F. (430° C.). About 5 percent excess air was provided through the main combustion air inlet. At a furnace temperature of about 2000° F. (1090° C.), the emissions of $NO_x$ were measured at about 30 parts per million (ppm) at 3 percent $O_2$ dry. The emissions of CO were measured at about 8 ppm at 3 percent $O_2$ dry.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An air staged low $NO_x$ flat flame burner system, comprising:
   a burner body comprising a primary air chamber and a secondary air chamber;
   an air inlet section comprising a main air inlet, the main air inlet attached to the burner body and configured to provide combustion air directly to the secondary air chamber;
   a nozzle section comprising a nozzle and a flame holder and disposed at one end of the burner body;
   a fuel passageway extending through the burner body and nested within the nozzle section, the fuel passageway comprising a tube configured to bleed fuel into venturi tubes that inject the bled fuel into the stage 1 air as it exits the stage 1 air passageways;
   a port block comprising an interior cavity and disposed around the nozzle section, the port block being configured for forming a flat flame wherein the port block comprises a annular first section having a substantially constant cross-section and an annular second section having an expanding cross-section; and,
   means for imparting swirl to air in the secondary air chamber,
   whereby configuration of the burner system produces a flat flame.

2. The burner system of claim 1, wherein the air inlet section further comprises a by-pass having a staged air valve configured to regulate a predetermined amount of combustion air through the air stage valve and into the primary air chamber.

3. The burner system of claim 1, wherein the air inlet section further comprises a divider plate and a stage air valve configured to regulate a predetermined amount of combustion air passing through the air stage valve and into the primary air chamber.

4. The burner system of claim 1, wherein the burner body further comprises a primary air inlet for providing a predetermined amount of combustion air to the primary air chamber.

5. The burner system of claim 1, wherein the nozzle section comprises stage 1 air passageways for receiving stage 1 air from the primary air chamber and stage 2 air passageways for receiving stage 2 air from the primary air chamber.

6. The burner system of claim 1, wherein the nozzle section further comprises the swirl rack that is configured to receive stage 3 air from the secondary air chamber and provide rotation to the stage 3 air as it is provided to the interior cavity of the port block.

7. The burner system of claim 1, wherein the burner body further comprises an orifice plate configured to impart a rotational swirling motion to stage 3 air within the secondary air chamber.

8. The burner system of claim 1, wherein the passageway tube is configured to bleed fuel into the venturi tubes through holes in the passageway tube.

9. The burner system of claim 7, wherein the nozzle is configured to inject fuel into the rotating stage 3 air in the port block first annular cross-section.

10. The burner system of claim 1, wherein the nozzle section includes stage 1 air passageways, stage 2 air passageways, and stage 3 air passageways that extend to an outlet of the nozzle section without recirculation.

11. The burner system of claim 10, wherein the nozzle section further comprises a swirl rack configured to receive stage 3 air from the secondary air chamber and provide rotation to the stage 3 air as it is provided to the interior cavity of the port block.

12. The burner system of claim 1, wherein the port block is located in a furnace wall, wherein the flat flame hugs the furnace wall.

13. The burner system of claim 1, wherein the port block is located in a furnace wall and a forward-most tip of the port block is flush with a furnace wall.

14. The burner system of claim 1 wherein the means for imparting swirl is a part of the nozzle.

15. The burner system of claim 1 wherein the flame holder includes radial holes that are configured to allow a portion of fuel and air to be pulled from the primary air chamber into the secondary air chamber.

16. An air staged low NOx flat flame burner system, comprising: a burner body comprising a primary air chamber and a secondary air chamber; an air inlet section comprising a main air inlet, the main air inlet attached to the burner body and configured to provide combustion air directly to the secondary air chamber; a nozzle section comprising a nozzle and a flame holder and disposed at one end of the burner body; a fuel passageway extending through the burner body and nested within the nozzle section; a port block comprising an interior cavity and disposed around the nozzle section, the port block being configured for forming a flat flame wherein the port block comprises a annular first section having a substantially constant cross-section and an annular second section having an expanding cross-section; and, means for imparting swirl to air in the secondary air chamber, wherein the nozzle is configured to inject fuel into the rotating stage 3 air in the port block first annular cross-section; whereby configuration of the burner system produces a flat flame.

17. The burner system of claim 16 wherein the flame holder includes radial holes that are configured to allow a portion of fuel and air to be pulled from the primary air chamber into the secondary air chamber.

* * * * *